US011244688B1

(12) United States Patent
Warner

(10) Patent No.: US 11,244,688 B1
(45) Date of Patent: Feb. 8, 2022

(54) SYSTEMS, DEVICES, SOFTWARE, AND METHODS FOR IDENTITY RECOGNITION AND VERIFICATION BASED ON VOICE SPECTRUM ANALYSIS

(71) Applicant: Lingual Information System Technologies, Inc., Elkridge, MD (US)

(72) Inventor: Paul J. Warner, Silver Spring, MD (US)

(73) Assignee: Lingual Information System Technologies, Inc., Elkridge, MD (US)

( * ) Notice: Subject to any disclaimer, the term of this patent is extended or adjusted under 35 U.S.C. 154(b) by 0 days.

(21) Appl. No.: 17/012,740

(22) Filed: Sep. 4, 2020

Related U.S. Application Data

(63) Continuation-in-part of application No. 16/135,506, filed on Sep. 19, 2018, now Pat. No. 10,803,873.

(60) Provisional application No. 62/560,640, filed on Sep. 19, 2017.

(51) Int. Cl.
| | |
|---|---|
| *G10L 17/06* | (2013.01) |
| *G10L 17/04* | (2013.01) |
| *G10L 17/02* | (2013.01) |
| *G10L 15/30* | (2013.01) |
| *G10L 17/22* | (2013.01) |
| *G06F 21/32* | (2013.01) |

(52) U.S. Cl.
CPC .............. *G10L 17/04* (2013.01); *G10L 15/30* (2013.01); *G10L 17/02* (2013.01); *G10L 17/22* (2013.01); *G06F 21/32* (2013.01)

(58) Field of Classification Search
CPC ...................................................... G10L 17/06
See application file for complete search history.

(56) References Cited

U.S. PATENT DOCUMENTS

| | | | |
|---|---|---|---|
| 4,720,863 A | * | 1/1988 | Li ........................ G10L 17/02 704/246 |
| 7,571,093 B1 | | 8/2009 | Cusmariu |
| 7,650,281 B1 | | 1/2010 | Cusmariu |
| 7,818,168 B1 | | 10/2010 | Cusmariu |
| 7,895,659 B1 | | 2/2011 | Cusmariu |
| 8,200,980 B1 | | 6/2012 | Robinson et al. |
| 2002/0030584 A1 | | 3/2002 | Perler et al. |
| 2002/0145559 A1 | | 10/2002 | Sullivan |
| 2009/0254464 A1 | | 10/2009 | Bonner et al. |

(Continued)

*Primary Examiner* — Ibrahim Siddo
(74) *Attorney, Agent, or Firm* — Law Office of Michael Antone; Michael Antone

(57) ABSTRACT

Hardware and/or software systems, devices, networks, and methods for identity recognition and verification based on vocal spectrum analysis. The system including one or more processors coupled to a memory/storage to collect audio samples sufficient to generate a speaker identification reference pattern and a speaker identification verification pattern, generate a speaker identification reference pattern from the audio samples and a speaker identification verification pattern from other audio samples, compare the speaker identification verification pattern with the speaker identification reference pattern; and provide a response indicating whether the speaker identification verification pattern and the speaker identification reference pattern were generated based on audio samples from the same person. The system may be employed on a mobile phone in near field communication with a control system and may include a management platform.

20 Claims, 7 Drawing Sheets

(56) References Cited

U.S. PATENT DOCUMENTS

| | | |
|---|---|---|
| 2011/0082777 A1 | 4/2011 | Chess |
| 2015/0170104 A1 | 6/2015 | Yamada et al. |
| 2015/0356974 A1* | 12/2015 | Tani ........................ G10L 17/06 704/239 |

* cited by examiner

Speaker requests system access

Speaker is prompted to provide one or more 3-4 second speaking samples, e.g., 3 samples, for enrollment Digitize Sample(s)

Check sample quality

Perform transform on segmented samples

Extract spectra/ sub-spectra features to discern formant properties and associated harmonics Average the power in each frequency sub-spectra across the time intervals and samples Store super vector as SIRP associated with the enrolled speaker

FIG. 3

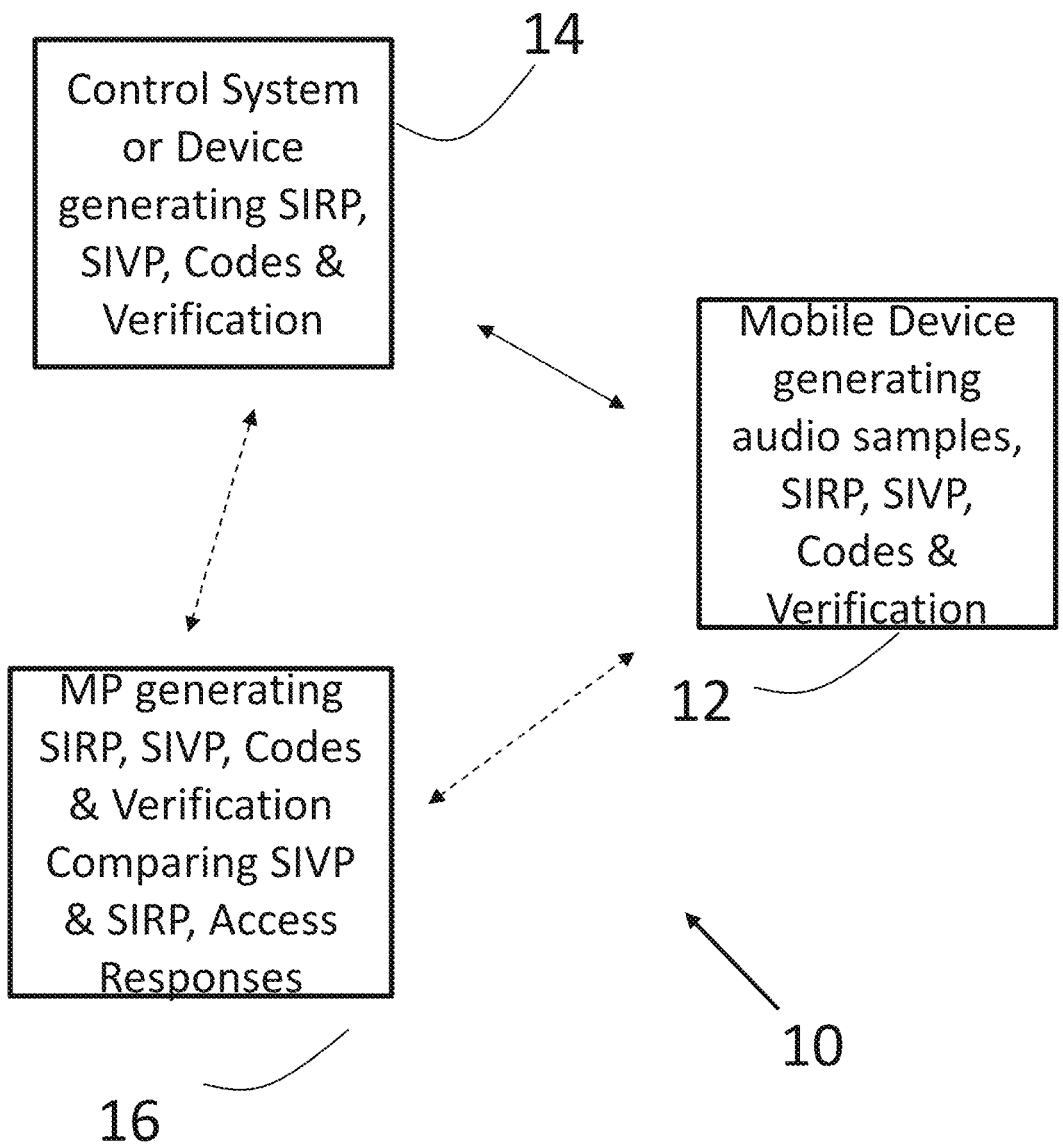

SYSTEMS, DEVICES, SOFTWARE, AND METHODS FOR IDENTITY RECOGNITION AND VERIFICATION BASED ON VOICE SPECTRUM ANALYSIS

CROSS-REFERENCE TO RELATED APPLICATIONS

This non-provisional patent application is a continuation-in-part of U.S. patent application Ser. No. 16/135,506 filed Sep. 19, 2018, which claims the benefit of and priority to U.S. Provisional Patent Application No. 62/560,640 filed Sep. 19, 2017, each of which is incorporated herein by reference in its entirety.

BACKGROUND OF THE INVENTION

Field of the Invention

The present invention relates in general to identity recognition and verification using biometric data. More specifically, the present invention relates to hardware and/or software systems, devices, networks, and methods for identity recognition and verification based on voice spectrum analysis.

Background Art

Identity recognition and verification based on biometric data is increasing in popularity as technology advances have reduced implementation costs across a wide variety of applications. However, technology advances have also decreased the level of security provided by biometric data, because if the data can be digitized, then it can be copied or otherwise compromised.

One method to combat the increasing security risks associated with biometric data and other access technologies is the multi-step, or factor, verification process, which assumes that potential intruders do not have access to the data required for all of the different verification steps. Another challenge with multi-step verification is that it is not convenient for the user.

As such, there is a continuing need for improved systems, devices, and methods that provide increased levels of security that do not necessarily rely on all user data being secure, and are more convenient for the user.

BRIEF SUMMARY OF THE INVENTION

Accordingly, hardware and/or software systems, devices, networks, and methods of the present invention enable increased levels of security and increase resistance to unauthorized access to secure systems by performing identity recognition and verification based on vocal spectrum analysis.

The system generally includes one or more devices including processors and at least one interface to enroll a speaker in a speaker identification ("SI") system ("SIS") by collecting one or more, e.g., three, voice samples at one or more system sampling rates and/or formats, e.g., 8 kHz, 16-bit, pulse code modulation (PCM) format. The SIS then processes the sample to provide a periodogram based on time-sliced segments. In various embodiments, the frequency spectrum is divided into a sufficient number of sub-spectra to enable the discernment of formant vectors, associated harmonics, cepstrum, partial linear predictive coding elements and burst characteristics on sub-frames. Some level of spectrum smoothing may be employed to handle inputs from different channels. A super vector may be produced based on these characteristics that may be stored as a speaker identification reference, or enrollment, pattern ("SIRP").

The system provides for verification or identification of a speaker by collecting audio sample(s) from a speaker desiring access via the SIS. Analogous to the enrollment process, the SIS processes the sample to provide a speaker identification verification pattern ("SIVP").

The SIS then compares the SIVP with a SIRP associated with the speaker/user and/or other SIRPs that may be stored in the SIS according to various metrics to determine the likelihood of a match between the SIVP and a SIRP, which may be in the form of a confidence level, probability of correctness, or other "score".

The multiple model paradigm affords a weighted scoring and allows for additional statistical computations. For example, one or more formants associated with each pattern may be compared as a first pass data filter to eliminate those SIRP that have very different formants. The various formants may be weighted to enable a SIS administrator to emphasize various voice spectral characteristics. For example, the fundamental frequency of the voice may be weighted most heavily. The verification step may further include analyzing the harmonics associated with one or more of the formants, as well as the relative power density across the frequency spectrum.

The present invention may be used to detect attempts to spoof the system through the use of audio recordings, instead of a live voice sample, by collecting voice samples in the enrollment phase and processing the enrollment voice sample into a sufficient number of sub-spectra to allow a comparison of harmonics between formants. For example, a forward or trailing slope for a formant over the sub-spectra may be calculated for the SIRP and SIVP. If the slopes are not within a user defined range than a verification voice sample may be deemed "suspect". The SIS may request another verification sample to analyze before granting access. While the present invention provides for a text independent analysis of a voice sample, in various embodiments, the SIS may include a text dependent analysis portion to assist with spoof detection.

The present invention may further enable the SIS to identify biological relationships of speakers with SIRPs stored in the system and with samples that may be collected. SIVPs and various SIRPs may be compared through the use of a cubic fit or autocorrelation to identify SI patterns that suggest a biological relationship. The transformation of the SIVP and SIRPs may enable the SIS to identify voice spectral patterns that are genetically present in biological relatives. In manners analogous to SI, a confidence level, probably of a correctness, or more generally a score, may be assigned based on various comparison between portions and/or all of the spectrum. In addition, segmented slope characteristics provide additional insight to such relationships.

The SIS may be embedded in or operate in conjunction with various electronic systems and devices that require enhanced security and/or ease of access. For example, fixed, portable, and mobile computing devices, Internet of Things (IoT) devices, automation & control, communication systems (VoIP, PBX systems, call centers, etc.), transportation, passport identification and other systems requiring identification or verification for access control, etc. may employ the SIS to allow a person to access the device or system through the use of voice login. One or more other access control methods, such as PINs, passwords, fingerprints and other biometrics, keys, NFC, etc. may also be employed with the SIS. The generated super vector may also be used as the key to subsequent cryptologic functions. The speech recognition modules may be utilized to allow electro-mechanical systems to be controlled by an authorized user. For example, the SIS may be provided as a distributed software as a service ("SAAS") solution. Various systems and devices employing the SIS may collect and provide audio samples to the SIS, which may process the audio sample to generate SIRPs or SIVPs that are compared with SIRPs stored in the SIS. The SIS would return either a score for the other system to evaluate or provide an access granted or denied response based on an established protocol for the systems and devices accessing the system and/or one or more potential speakers matching the SIVP based on SIRP stored in the SIS based on threshold scores, probabilities, etc.

In various embodiments, a portion or all of the SIS may be embodied in a smart card that may be voice verified by a person before the card is able to be used, e.g., provide access. The SIS may operate on the smart card autonomously, or may be configured to interoperate with another system before performing the verification. In various embodiments, the smart card includes a trusted platform module ("TPM") chip that may be used to store the SIRP and other secure data on the card.

In various embodiments, a portion or all of the SIS may be embodied in a mobile or other portable device, e.g. mobile phone, tablet, audio/video device, etc. ("mobile device") that may operate autonomously, or in cooperation with other proximate or remote systems to provide SIRPs or SIVPs for identity recognition/identification or verification for access, enrollment, etc. For example, the SIS may employ one or more software applications ("apps") running on the mobile device. The applications running on the mobile device may be configured to perform various functions of the SIS including the collection of audio samples for the SIRP and/or SIVP, SIVP recognition and verification, and notifications.

The mobile device may collect one or more audio samples from which SIRPs or SIVPs may be generated. The audio sample(s), SIVP, and/or speaker verification response may be provided to a participating access control system supporting financial transactions, e.g., ATMs, Point of Sale (PoS) device, etc., facility and other physical security, etc. via near field communication ("NFC") technologies, etc., and other systems that may be benefited by speaker identification and verification. For example, the SIS application(s) running on the mobile device could initiate communication with the participating system via NFC and transmit one or more of the verification audio sample(s), SIVP, and/or speaker verification responses via NFC and/or other communication protocol, such as Bluetooth, Wi-Fi, etc.

As may be disclosed, taught, and/or suggested herein to the skilled artisan, the present invention addresses the continuing need for systems, devices, and methods that provide increased levels of security, do not rely necessarily on the user data being secure, and are more convenient for the user.

BRIEF DESCRIPTION OF THE DRAWINGS

The accompanying drawings are included for the purpose of exemplary illustration of various aspects of the present invention to aid in description, and not for purposes of limiting the invention, wherein:

FIG. 3 illustrates exemplary embodiments of the enrollment process flow.
FIG. 7 illustrates exemplary embodiments of the system.

Figure 1:
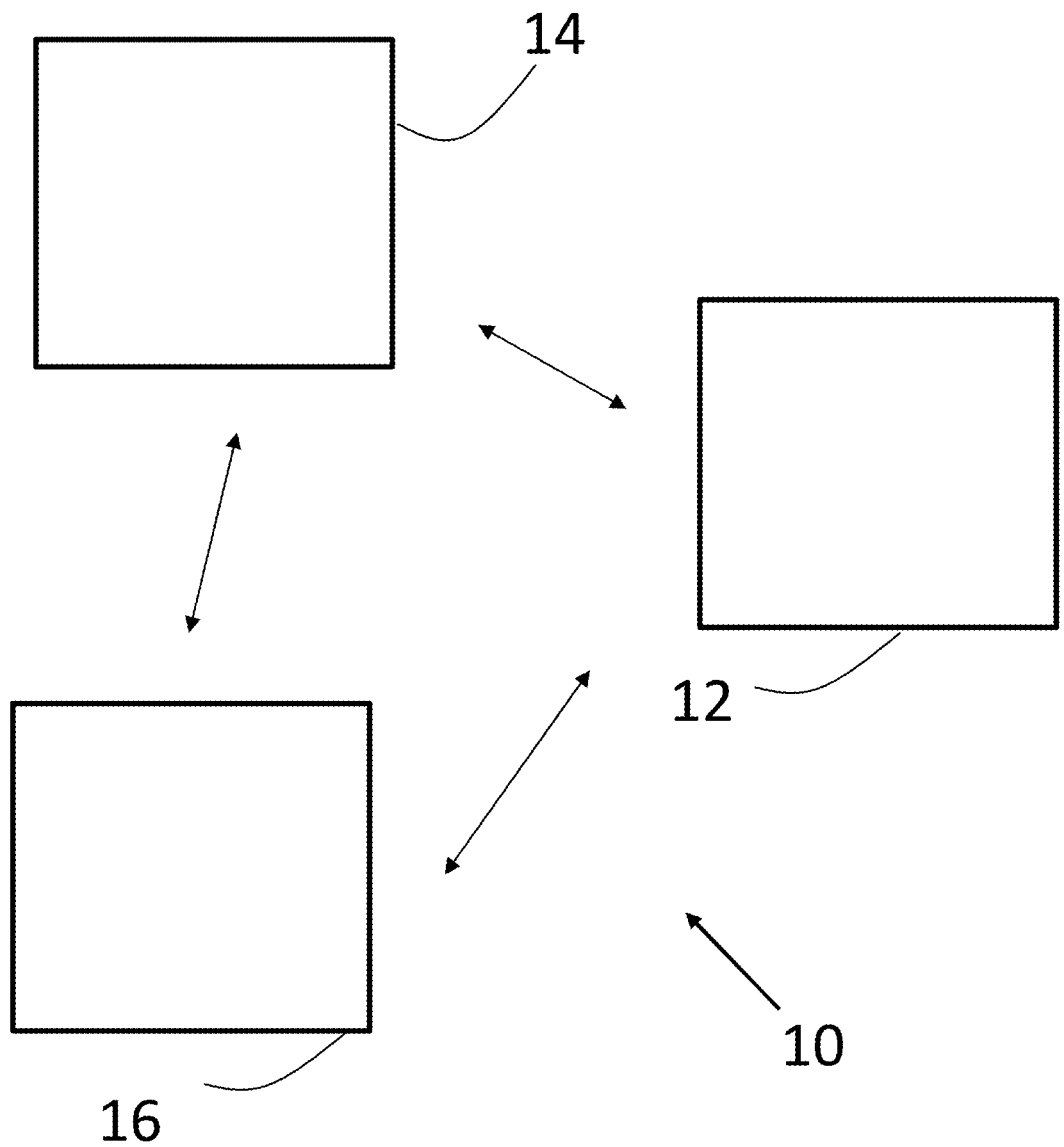
FIG. 1 illustrates exemplary embodiments of the system.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Hardware and/or software systems, devices, networks, and methods of the present invention are described herein, by way of example and otherwise.

FIG. 1 illustrates exemplary embodiments of a speaker identification system ("SIS") 10 in which one or more speaker identification devices ("SID") 12 receive vocal input from a speaker or via communication with one or more control systems or devices 14 and/or other SIDs 12. The system 10 may include a management platform (MP) 16, which may be centrally located or distributed, and may be used to oversee the operation of the system 10 and SIDs 12, allow for reprogramming of the SID 12 and remote services, such as software as a service verification and analysis. In FIG. 1, the various devices and systems 12, 14, and 16 are depicted by a single box; however, the devices and systems 12, 14, and 16 may include multiple components in a single device or multiple devices in a single or multiple locations.

In addition, two way arrows are shown between the devices and systems 12, 14, and 16, when present. It will be appreciated that various embodiments may include only one way communication between some or all of the systems and devices.

Figure 2:
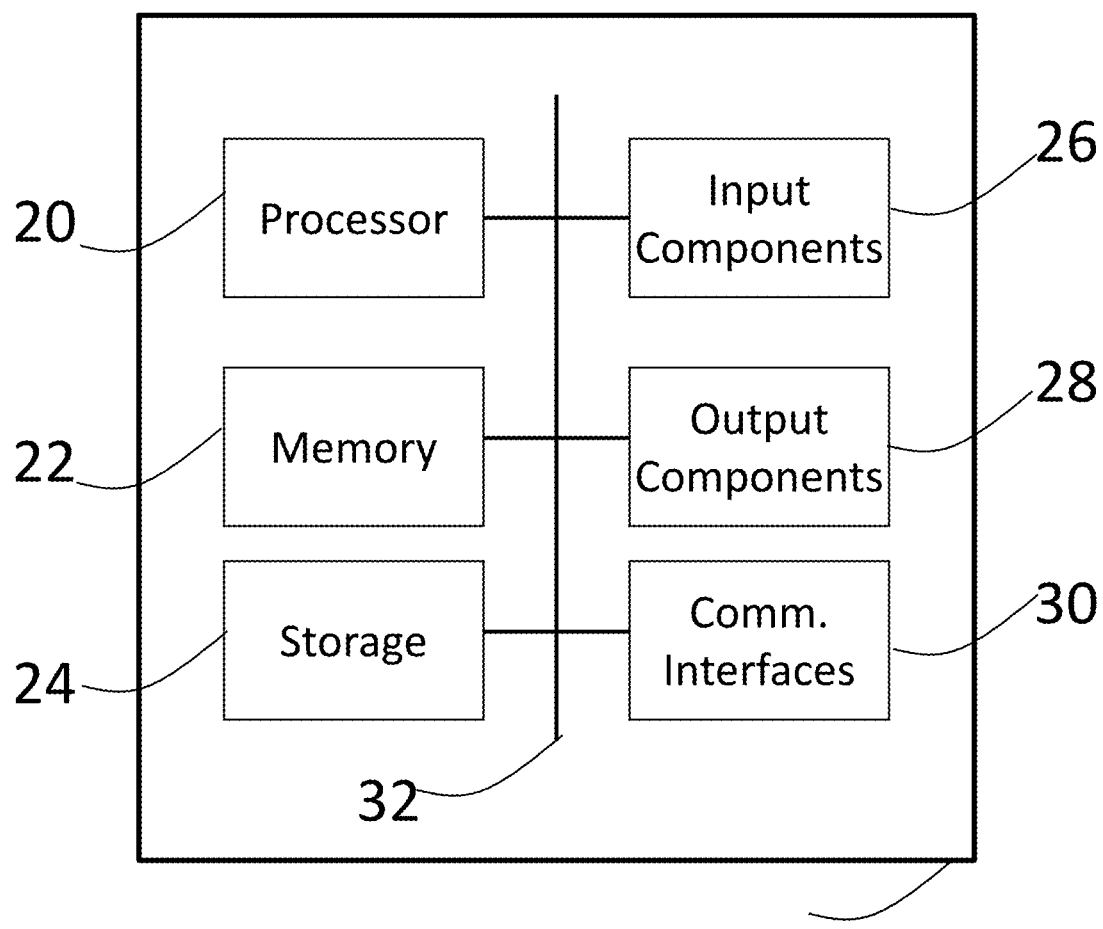
FIG. 2 illustrates exemplary components in various computing resources of the system.

FIG. 2 illustrates exemplary component embodiments that may be employed in the SIDs 12, control systems and devices 14, and management platform 16 that may interact with the system 10, which may be generally referred to as "computing resources". The computing resources may each include one or more processors 20, memory 22, storage 24, input components 26, output components 28, communication interfaces 30, as well as other components that may be interconnected as desired by the skilled artisan via one or more buses 32. As previously described, the components for the SIDs 12 and control systems and devices 14, and management platform 16 may be a single device or have multiple components in one or more coupled units, distributed in close proximity, and/or over geographically remote areas.

Processor(s) 20 may include one or more general or central processing units (CPU), graphics processing units (GPU), accelerated processing units (APU), microprocessors, and/or any processing components, such as a field-programmable gate arrays (FPGA), application-specific integrated circuits (ASIC), etc.) that interpret and/or execute logical functions. The processors 20 may contain cache memory units for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 20 may connect to other computer systems and/or to telecommunications networks as part of performing one or more steps of one or more processes described or illustrated herein, according to particular needs. Moreover, one or more steps of one or more processes described or illustrated herein may execute solely at the processor 20. In addition or as an alternative, one or more steps of one or more processes described or illustrated herein for execution in one processor may be executed at multiple CPUs that are local or remote from each other across one or more networks.

The computing resources of the system 10 may implement processes employing hardware and/or software to provide functionality via hardwired logic or otherwise embedded in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

Memory 22 may include random access memory (RAM), read only memory (ROM), and/or another type of dynamic or static storage device, such as flash, magnetic, and optical memory, etc. that stores information and/or instructions for use by processor 20. The memory 22 may include one or more memory cards that may be loaded on a temporary or permanent basis. Memory 22 and storage 24 may include a subscriber identification module (SIM) card and reader.

Storage components 24 may store information, instructions, and/or software related to the operation of the system 10 and computing resources. Storage 24 may be used to store operating system, executables, data, applications, and the like, and may include fast access primary storage, as well as slower access secondary storage, which may be virtual or fixed.

Storage component(s) 24 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate, including nano-scale medium. The computer-readable medium may be a biological, chemical, electronic, electromagnetic, infrared, magnetic, optical, quantum, or other suitable medium or a combination of two or more such media, where appropriate. Example computer-readable media include, but are not limited to fixed and removable drives, ASICs, CDs, DVDs, FPGAs, floppy disks, optical and magneto-optic disks, hard disks, holographic storage devices, magnetic tape, caches, programmable logic devices (PLDs), RAM and ROM devices, semiconductor memory devices, solid state drives, cartridges, and other suitable computer-readable media.

Input components 26 and output components 28 may include various types of input/output (I/O) devices. The I/O devices often may include a graphical user interface (GUI) that provides an easy to use visual interface between the user and system 10 and access to the operating system or application(s) running on the devices.

Input components 26 receive any type of input in various forms from users or other machines, such as touch screens and video displays, keyboards, keypads, mice, buttons, track balls, switches, joy sticks, directional pads, microphones, cameras, transducers, card readers, voice and handwriting inputs, and sensors for sensing information such as temperature, location via global positioning system (GPS) or otherwise, accelerometer, gyroscope, actuator data, which may be input via a component in the user device 12 and/or received via one or more communication interfaces 30.

Output component 28 may include displays, speakers, lights, sensor information, printers, etc. Similar to the input, the output may be provided via one or more ports and/or one or more communication interfaces 30.

Communication interface 30 may include one or more transceivers, receivers, transmitters, modulators, demodulators that enable communication with other devices, via wired and/or wireless connections. Communication interface 30 may include Ethernet, optical, coaxial, universal serial bus (USB), infrared, radio frequency (RF) including the various Wi-Fi, WiMax, cellular, and Bluetooth protocols, such as Bluetooth, Bluetooth Low Energy (BLE), Wi-Fi (IEEE 802.11), Wi-Fi Direct, SuperWiFi, 802.15.4, NFC, LTE systems, LTE Direct, past, current, and future cellular standard protocols, e.g., 4-5G, or other wireless signal protocols or technologies as described herein and known in the art.

Bus(es) 32 may connect a wide variety of other subsystems, in addition to those depicted, and may include various other components that permit communication among the components in the computing resources. The bus(es) 32 may encompass one or more digital signal lines serving a common function, where appropriate, and various structures including memory, peripheral, or local buses using a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

The computing resources of the system 10 may provide functionality as a result of the processors 20 executing software embedded in one or more computer-readable storage media residing in the memory 22 and/or storage 24 and logic implemented and executed in hardware. The results of executing the software and logic may be stored in the memory 22 and/or storage 24, provided to output components 28, and transmitted to other devices via communication interfaces 30. In execution, the processor 20 may use various inputs received from the input components 26 and/or the communications interfaces 30. The input may be provided directly to the processor 20 via the bus 32 and/or stored before being provided to the processor 20. Executing software may involve carrying out processes or steps may include defining data structures stored in memory 22 and modifying the data structures as directed by the software.

FIG. 3 sets forth for exemplary steps involved in the enrollment process and the beginning phase of the verification process. A person that desires to access the SIS 10 (an "enrollment person") may request access and be prompted by the SIS 10 to provide, or the SIS 10 may collect from a person identified with, one or more audio enrollment samples for vocal spectrum analysis. While one sample may be sufficient, multiple samples tend to increase the likelihood that a wide range of audio signals are collected. For example, three audio samples, each of 3-4 seconds in duration may often provide a sufficient wide range of samples for characterization and generation of a system identification reference pattern for use in the present invention. The audio samples represent "raw" audio data.

The audio enrollment samples may be digitized in various manners known to one of ordinary skill. For example, the samples may be collected at 8 kHz in a 16-bit, pulse code modulation (PCM) format. In various embodiments, the raw data may be digitized with multiple sampling rates and formats.

The raw digitized data may be analyzed initially to determine whether the data is of sufficient quality and characteristics for use in the analysis. For example, a root mean square analysis (RMS) and slope analysis of the data may be performed to confirm that the sample contains sufficient energy to be analyzed and is relatively consistent over the sample duration. Also, the sample may be checked to ensure that the sample includes a voice sample of sufficient duration for a meaningful analysis. For example, while the sample is 3-4 seconds in duration, if the sample includes too many pauses or other breaks in the speech, the sample may not be of sufficient quality.

The raw digitized data may be converted from a time domain basis to a frequency domain basis by performing a series of Fourier Transforms, e.g., Fast Fourier Transforms (FFT), or wavelet transformation, on the digitized data. Fourier/wavelet Transforms may be performed in blocks over intervals of data in the time domain, e.g., 10-20 ms, over the duration of the sample to transform the data into frequency over a frequency spectrum.

A periodogram of each sample may be developed by separating the FFT data into multiple sub-spectrum windows of varying frequency resolution. The frequency range analyzed and the number of sub-spectrums to divide the voice frequency range may be determined by the skilled artisans. For example, the frequency range for audible hearing is generally 20 Hz-20 kHz with fundamental frequencies for most adult males, females, and children falling in the ranges 85-155 Hz, 165-255 Hz, and 250-300 Hz, respectively, and the majority of most vocal sounds ranging from 80 Hz-3000 kHz. The frequency range for each sub-spectra may be constant or variable, e.g., octaves, locally concentrated, etc. across the frequency spectrum. For example, the voice frequency spectrum may be divided into 100 sub-spectra having a frequency range of 80-320 Hz. In various embodiments, the frequency resolution of the sub-spectra may be determined based on the sampling rate of the audio sample and the FFT block size. In addition, the zero-crossing mean may be determined and included as an addition to the super-vector.

The sub-spectrum frequency energy data may be converted into log format to linearize the data. The log voice data may be averaged over each sub-spectrum and across all samples and an antipodal conversion of the averaged sub-spectrum energy data may be performed to produce a speaker identification ("ID") reference, or enrollment, pattern ("SIRP") comprised of energy levels over a vocal spectrum divided into the multiple sub-spectra. The SIRP may be normalized as desired to support data comparisons with verification sample patterns and other SIRPs. The SIRP is then associated with the person providing the enrollment sample and stored for use by the SIS 10.

The above process produces a SIRP that is text and language independent that may be used in a wide range of applications to 1) verify the identity of a person, or 2) identify an unknown speaker. That being said, the SIS 10 may also be employed in text and language dependent systems and mixed systems as described below. For example, the SIS 10 may be used for various device logins and other system access applications in which a person desiring to access a system may provide initially, a voice sample according to the system from which the SIRP is created by the above procedure and stored.

Figure 4:
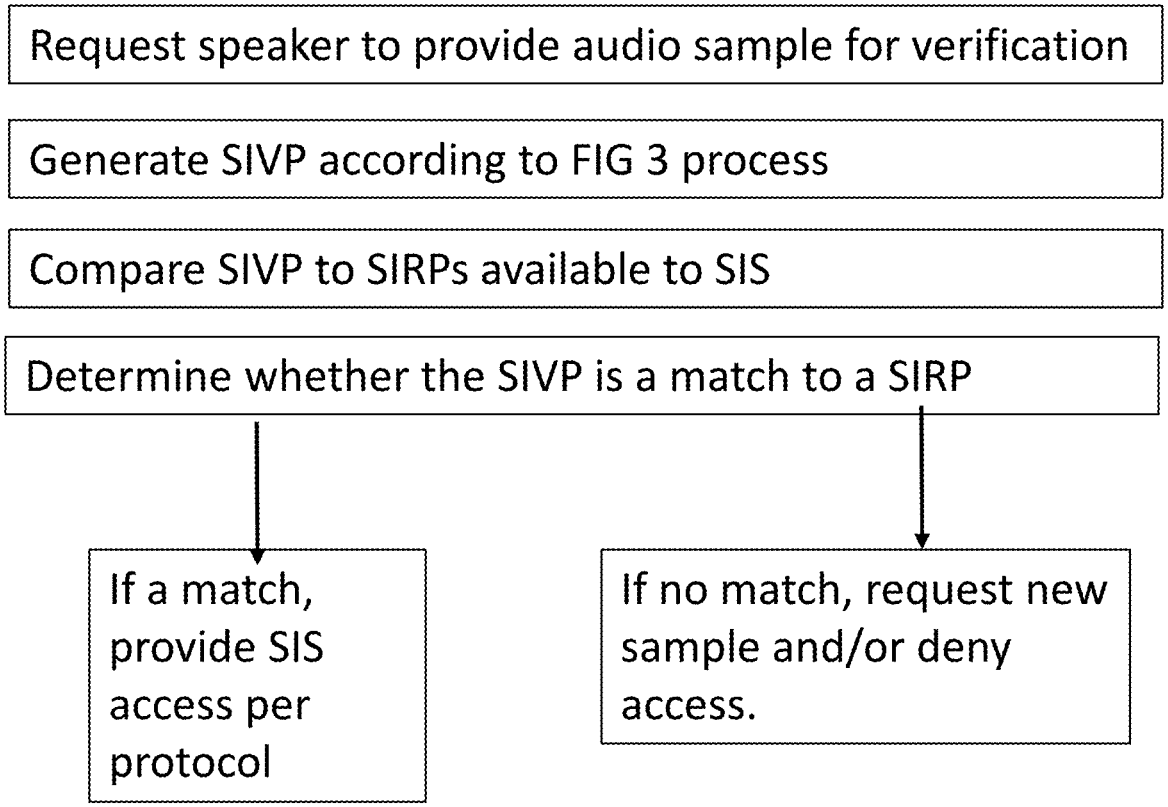
FIG. 4 illustrates exemplary embodiments of the verification process flow.

FIG. 4 sets forth exemplary steps involved in the verification process, such as when a person (a "verification person") attempts to access a restricted access system ("RAS") employing the SIS 10 or the SIS 10 attempts to identify a speaker. The person, or speaker, to be verified may be requested to provide, or the SIS 10 may collect, a voice verification sample that will be processed according to the above method shown in FIG. 3 to provide a speaker identification verification pattern ("SIVP").

The SIVP is compared to a known SIRP associated with the speaker attempting to be verified and/or other SIRPs that are stored in the SIS 10 as may be known to identify the speaker in one or more steps depending upon level of security desired by a SIS 10 administrator. If the SIVP is a match with a SIRP, then the SIS 10 will provide access to the system or to a next step in the access procedure.

If no SIRPs are identified as a match, the SIS 10 may request another sample. If multiple samples can not be identified, the SIS 10 may deny access to the speaker and/or may initiate the enrollment process with the speaker to convert the SIVP to a SIRP in the SIS 10.

If the speaker opts to not proceed with the enrollment process, the SIS 10 may identify the SIVP with time, location, and other stamps and store the SIVP as an unknown speaker SIRP for future reference. The unknown SIRP may be used by various systems to identify speakers that are not enrolled in the RAS, but have attempted to access the RAS at other times. In addition, when a person attempts to enroll in the SIS 10, the SIS 10 may compare an enrollment request sample to the SIRPs of both known and unknown speakers to determine whether a person is already enrolled or is not enrolled, but has previously attempted to access the RAS via the SIS 10.

Various comparisons may be made between the SIRP and the verification sample as are known to those of ordinary skill. For example, a relative energy/power comparison may be made as a function of sub-spectra frequency. Various weightings may be given to the different vectors and the relative comparisons of the sub-spectrum data, which may be used to provide various levels of confidence in the SI.

For example, a first comparison may identify the SIRPs that have a similar fundamental frequency or formant to the SIVP. The SIS 10 may then proceed to one or more other comparisons, such as comparing multiple formants in the SIVP and SIRPs. For example, the relative power density of the formants, formant spacing/slopes, formant harmonics, and various power distribution across one or multiple sub-spectra may be compared. See, for example, M. A. Bashar et al., Text-Independent Speaker Identification System Using Average Pitch and Formant, International Journal on Information Theory (IJIT), Vol. 3, No. 3, July 2014 for a discussion of various comparisons.

In many, and perhaps all, instances, the SIVP may not perfectly match a SIRP across the entire spectrum or even a portion of the spectrum. As such, a skilled artisan may use various quantifications of similarities to provide a confidence level or other score when comparing sample patterns to the reference pattern. For example, in the extreme case, a perfect mapping of a sample pattern onto a reference pattern would be assigned a 100% confidence/score for SI. Conversely, a sample pattern that does not map onto any reference pattern at all may be assigned 0% confidence/score of a match or 100% confidence of no match.

In between the extreme cases, a skilled artisan may decide various levels of confidence and other "scores" that may be appropriate for various applications of the SIS 10. For example, for applications where SI is the only access control being used on a RAS, it may be desirable to require a higher confidence level or score for a sample pattern than for a RAS that employs the SIS 10 in combination with one or more other access control technologies, such as PINs, passwords, other biometrics, etc. The SIVP may be compared to multiple SIRPs to provide a score or confidence level for each SIRP relative to other SIRPs.

In various embodiments, the SIVP and SIRPs are subject to comparison by means of a zero-crossing mean and variance of autocorrelation. A confidence level, probability of correctness, or more generally a score may be calculated. Depending upon the embodiment, it may be desirable to include Receiver Operating Characteristic (ROC) Curve vectors in the analysis. In some embodiments, the sample may be subject to burst segmentation using vowel trigger detection from envelope using a differential integrating correlator to verify alphanumeric phrases as well as numeric sequences.

An example output may be: Matched: Mr. or Ms. I. M. Matched, Confidence: 0.98 Probability Correct: 0.99, Score: 99.

In various access control applications, a person will be enrolled in the SIS 10 in a secure manner, such as presenting themselves to security personnel overseeing the system and providing the enrollment speech samples after presenting such personal identification to the security personnel. The SIRP may then be maintained in a secure portion of the SIS 10, such as one or more secure servers.

When a person wants to access the controlled system via an access control point, the person will be prompted to speak for a sufficient duration to provide a verification sample. The requested speech may be randomly generated numeric or alphanumeric phrases, answers to questions, etc., as may be desired.

The present invention may be used to detect to attempts to spoof the SIS 10 through the use of audio recordings, instead of a live voice sample, by collecting voice samples in the enrollment phase and processing the enrollment voice sample into a sufficient number of sub-spectra to allow a comparison of harmonics between the formants. For example, one or more forward or trailing slopes associated with a formant over the sub-spectra may be calculated for the SIRP and SIVP. If the slopes are not within a user defined range than a verification voice sample may be deemed "suspect". The SIS 10 may request another verification sample to analyze before granting access. While the present invention provides for a text independent analysis of a voice sample, in various embodiments, the SIS 10 may include a text dependent analysis portion to assist with spoof detection. For example, the answers to questions used to generate the audio sample may be used in the access process.

Figure 5:
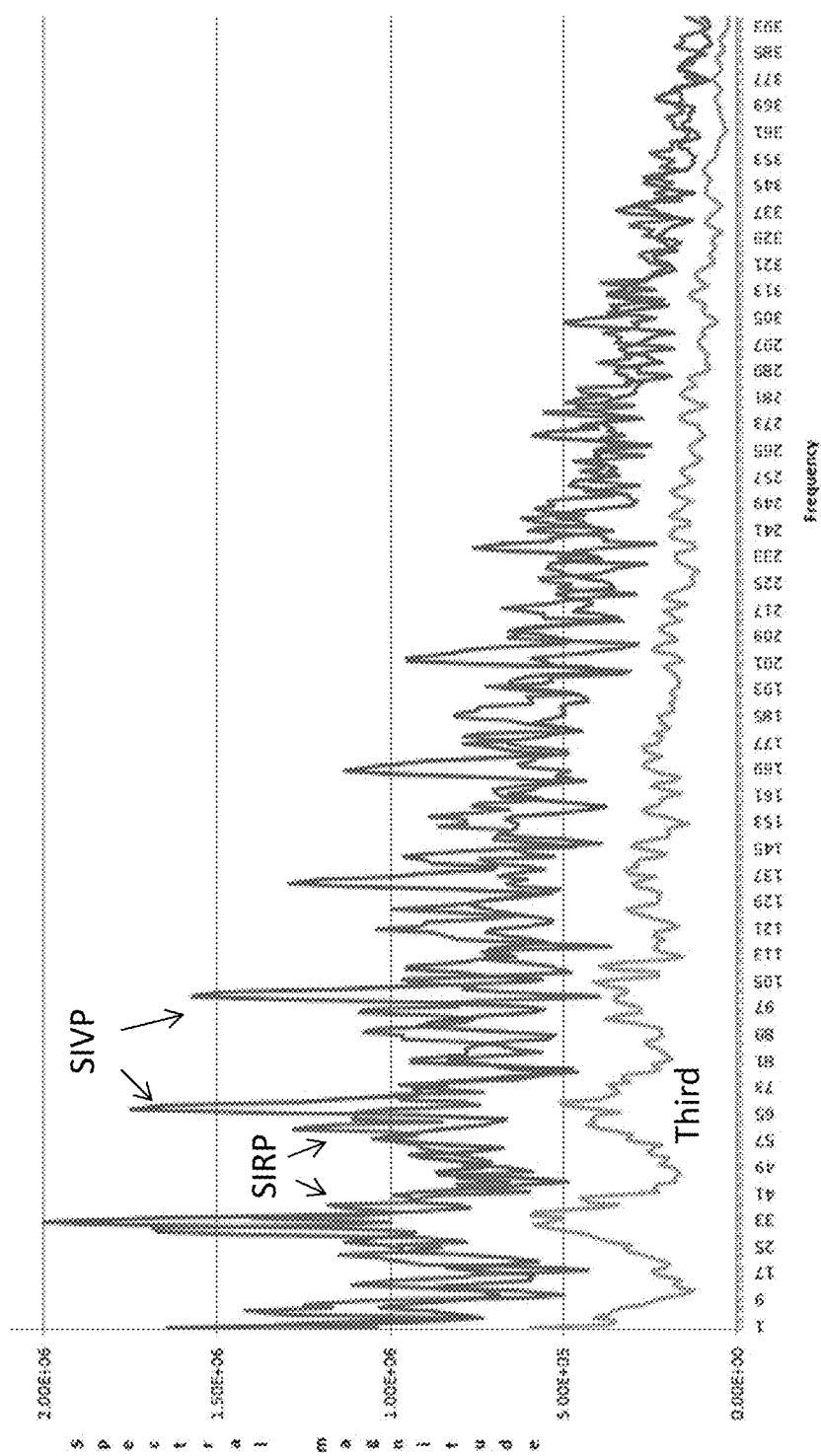
FIG. 5 illustrates exemplary plots of power versus frequency sub-spectra that may be used as a speaker identification reference pattern.

FIG. 5 shows an exemplary power (log of the voltage) versus sub-spectra frequency plot showing an exemplary comparison of a SIVP (red curve) versus a matching (SIRP) (blue curve) along with third sample from the same person (green curve). The spectrum was divided into sub-spectra by taking the sampling rate/FFT block size. Once a match is identified, the SIS 10 may analyze the forward and trailing slopes for one or more of the formants. As shown in FIG. 5, there is a slope deviation between the red and blue curves, which may suggest a spoof sample. If a spoof sample is suspected, the SIS 10 may request a new sample from the speaker, which may be a random phrase and a specific text sequence to confirm that the audio sample includes the requested words. In addition, the SIS 10 or associated RAS may require additional access control steps be taken.

It will be appreciated that the audio sample format and/or sub-spectra divisions may be varied by the skilled artisan to enable various levels of spoof detection. For example, voice samples may be digitized using multiple sampling rates and formats to enable the above spoof analysis to be performed multiple times on one verification sample.

Various embodiments of the present invention may further enable the SIS 10 to identify biological relationships of speakers with SIRPs stored in the system. A verification sample may be collected and SIVP produced.

The SIVP may then be compared to one or more SIRPs and assigned a confidence level, probability, or generally a score, as is done when identifying/verifying the speaker. In this case, while the scores may not be as high as when identifying/verifying the same speaker, biological relatives will generally have a higher score than non-biological relatives. In this manner, potential biological relatives may be sorted from speakers that are not biological relatives.

Figure 6:
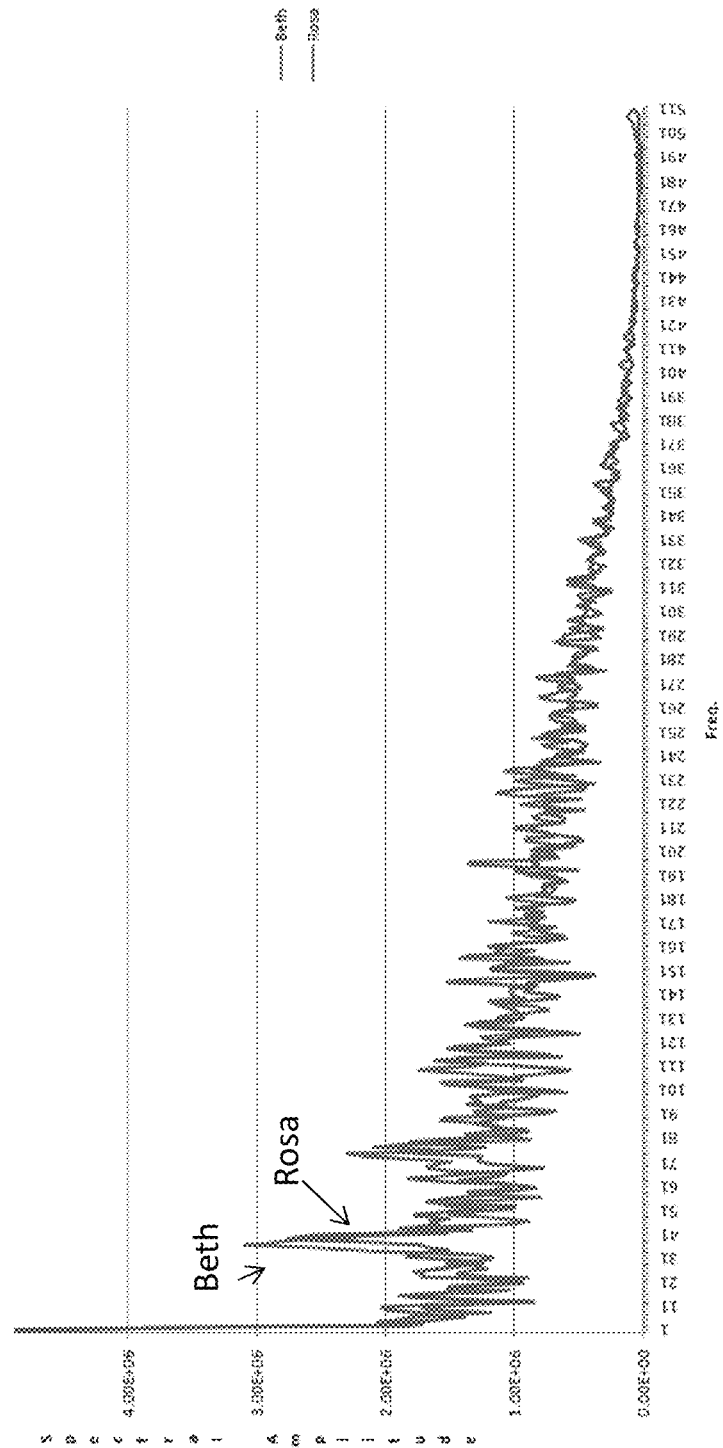
FIG. 6 shows exemplary periodograms of two female biological relatives.

FIG. 6 shows exemplary periodograms of two female biological relatives. As can be seen, the periodograms are quite similar with the formant frequencies being slightly offset.

In various instances, differences in the formant frequencies may be more significant and may be better resolved by performing a wavelet transformation or frequency translation of the SIVP relative to the SIRP. The transformation of the SIVP may enable the SIS 10 to identify voice spectral patterns that are genetically present in biological relatives, but shifted due to age, size, gender, etc.

Biological relative identification of the present invention may be employed in various applications, such as security, law enforcement, missing and lost person identification, and identifying biological relatives in general.

The SIS 10 may be embedded in, or operated in conjunction with, various systems and devices that require enhanced security and/or ease of access. For example, fixed, portable, and mobile computing devices, IoT devices, automation 86 control, communication systems (VoIP, PBX systems, call centers, etc.), transportation and other systems requiring access control, etc. may employ the SIS 10 to allow a person to access the device or system through the use of voice login, or voice initiate the starting of a vehicle or changing the settings on an operating system.

In various embodiments, such as in FIG. 1, the SIS 10 may be operated in a distributed manner to provide a SAAS solution having a remote portion, and in some embodiments a local portion. Various systems and devices 16 employing the SIS 10 collect audio samples that are provided to the SIS 10, which generates SIRPs and/or SIVPs and compares the SIVPs to the SIRPs stored in the SIS 10. The SIS 10 may return either a score for the other system 16 to evaluate or provide an access granted or denied or an identification response based on an established protocol for the systems and devices 16 accessing the SIS 10. The SIVP and/or SIRPs also may be generated locally at the system 16 or at the remote portion of the SIS 10. A centralized remote SIS 10 may enable a wide range of applications, systems, and device to employ SI and leverage the scale provided by a widely accessible database of SIRPs.

The voice login and/or control process would generally involve the enrollment and verification processes described herein. One or more other access control methods, such as PINs, passwords, fingerprints and other biometrics, keys, etc. may also be employed with the SIS 10. Device logins may be performed with either a local (on device) or remote (on another device) generation of the enrollment SIRP and generally with local verification of the access request verification sample.

For example, the system 10 may be employed as an access control application on various devices 16 that includes a microphone or other methods to provide audio samples to the device 16. Mobile phones, tablets, and laptops are typically equipped with microphones that may be used to provide the system 10 with the audio samples for SIRP and/or SIVP generation. Other devices, such as a desktop computers, etc. may have built-in microphone and/or enable audio input via microphones and other peripherals.

The system 10 may be used to control access to the device, e.g. mobile phone, as well as access to various applications running on the device 16. For example, a user and/or administrator may download the system 10, or a portion thereof, onto a mobile phone. The application may then be opened and used to receive audio samples and generate the SIRP for the phone. The SIRP may be used to provide voice control access to unlock the phone, as well as for various applications running on the phone, such as an application to protect passwords, bank accounts, financial application logins, etc. In this manner, even if an unauthorized party obtains the phone, or other device, that is unlocked, the system 10 may prevent access to applications running on the phone protected by the system 10. As noted above, the system 10 may also be implemented to require that the user speak one or more passphrases that would augment the protections provided by the system 10. As also noted above, the SIRP may typically be generated and stored locally on the phone, but may be generated and/or stored remotely to the phone.

In various embodiments, a portion or all of the SIS 10 may be embodied in a smart card that may be voice verified by a person before the card is able to be used. The SIS 10 may operate on the smart card autonomously, or may be configured to interoperate with another system before performing the verification. In various embodiments, the smart card includes a trusted platform module ("TPM") chip that may be used to store the SIRP and other secure data on the card. In various embodiments, SI may be performed on a smart card that is equipped with a microphone to intake a verification sample and perform the verification on the device. The enrollment sample and SIRP may also be generated on the card and/or installed from another system as desired.

The smart card, which may be any type of access control card, USB stick, etc. may be separately secure from a system or device with which it is being used. In these embodiments, the card may be unlocked with SI verification performed on the card before the card can be used to access a system or another device. For example, an ATM or credit card may require that the SIS be used to unlock the card before it may be used to complete a transaction.

In various embodiments, the smartcard may include a custom microphone, optimized for speech and capable of noise cancelation and including software and/or firmware to secure voice biometrics from capture through transmission and storage. In various embodiments, self-contained firmware may provide a statistically validated access decision elaborated by a percent confidence and probability of correctness. In addition, the microphone rejects low quality, insufficient and spoofed data, while successfully operating in noisy environments.

Another Spoofing combat methodology that may be include within the microphone is the ability to generate a random 6-8 digit number via the chips on-board Federal Information Processing Standard (FIPS) Publication 140-2, (FIPS PUB 140-2) compliant random number generator ("RNG") which may be validated for the correct spoken sequence well as the individuals voice biometric.

In various embodiments, a portion or all of the SIS 10 may be embodied in the SID 12, such as a mobile or other portable device, e.g. mobile phone, tablet, audio/video device, etc. ("mobile device"), that may operate autonomously, or in cooperation with other proximate or remote systems to provide identity recognition/identification and/or verification for access control and other applications. For example, the SIS 10 may employ one or more software applications ("apps") running on the mobile device 12. The applications running on the mobile device 12 may be configured to perform various functions of the SIS 10 including the collection of audio samples for SIRP and/or SIVP generation, SIVP verification, and notifications. While there may be some embodiments where the SIS 10 may compare an SIRP or SIVP to a SIRP database to identify the speaker, in many embodiments, SIRP databases or even individual SIRPs may not be maintained on individual mobile devices.

The system 10 generally includes one or more processors coupled to a memory/storage to collect enrollment audio samples sufficient to generate a speaker identification reference pattern and verification audio samples sufficient to generate a speaker identification verification pattern. The system 10 generates a speaker identification reference pattern from the enrollment audio samples and a speaker identification verification pattern from the audio samples. The enrollment audio samples are collected at the time of system set-up or registration of a speaker. The audio samples are collected at the time the system 10 is being used to verify or identify a person based on comparison audio samples. The verification or identification is generally performed in conjunction with a control system that is controlling access or authorization of some kind, such as financial access to account via ATMs or otherwise, physical access to facilities, identity verification, etc., but may also be used forensically for identification and other purposes. The speaker identification verification pattern is compared with the speaker identification reference pattern and an access granted/approved/authorized or a speaker recognized or not response is provided when the comparison indicates that the speaker identification verification pattern and the speaker identification reference pattern were generated based on audio samples from the same person. The access granted or speaker identified/recognized response can be based on a threshold score, a confidence level, probability, etc. The system 10 may be employed on the mobile phone 12 in near field communication with the control system 14 and may include the management platform 16.

For example, the mobile device 12 may collect one or more audio samples from which SIRPs and/or SIVPs may be generated. The audio sample(s), SIVP, and/or speaker verification may be provided to a participating access control system 14 supporting financial transactions, e.g., ATMs, Point of Sale (PoS) device, etc., facility and other physical security, etc. via NFC technologies, etc., as well as other systems that may benefit from speaker identification and verification. For example, the SIS 10 application(s) running on the mobile device 12 could initiate communication with the participating system 14 via NFC and transmit one or more of the audio sample(s), SIVP, and/or speaker verification response via NFC and/or other communication protocol, such as Bluetooth, Wi-Fi, etc., as described herein and/or known to one of ordinary skill.

FIG. 7 shows various embodiments, the SIS 10 is installed at least in part on the mobile device 12 and the control device or system 14. The control device or system 14 may be any system in which recognition of a user is desirable, such as financial systems, e.g., ATMs, Point of Sale (PoS) systems, etc., facility security, etc. In setting up the SIS 10, the user will access the control device or system 14, either locally or remotely, and generate audio samples that will be used to generate the SIRP and, in some instances, a verification code. In various embodiments, the SIRP and/or verification code may be generated by the mobile device 12 and provided to the control system 14 and stored locally or remotely in the system 14. For example, one or more applications running on the mobile device 12 may generate the SIRP to be used for verification that may be transmitted to the control system 14 and stored for later use in user identification, which may also include an identifier associated with the mobile phone providing the SIRP.

When the user wants to use the SIS 10 to verify or identify the user/speaker to the control system 14 at a later date, the user will generate an audio sample using the mobile device 12 that may be date & time stamped and provided to the control system 14 as either raw audio samples, the SIVP, and/or verification codes via NFC as noted above to ensure the user/speaker is proximate to the control system 14. If audio samples are transmitted to the control system 14, then the audio analysis software needed to generate the SIVP and compare it to the SIRP must be resident either locally or remotely in the control system 14 to verify the speaker. If the SIVP is transmitted by the mobile device 12, then the control system 14 may perform the comparison of the SIVP to the SIRP.

If the mobile device 12 generates the SIVP and compares the SIVP with the SIRP, then the control system 14 may only need to receive one or more verification codes that may be compared to the verification codes generated during the set-up/registration of the SIS 10. For example, the SIS 10 may be architected such that a verification code is provided if the SIVP matches the SIRP at a certain confidence level. A no-match code may also be generated if the SIVP does not match the SIRP at a certain confidence level or no code generated.

In other embodiments as depicted by the dotted lines in FIG. 7, the mobile device 12 and/or the control system 14 may transmit to, or through, and may store the SIRP and/or verification code in the management platform 16. In this manner, the SIS 10 may operate similar to, and perhaps in cooperation with financial systems and access control system. The mobile device 12 may be used to generate audio samples that may be transmitted to the management platform 16 or used to generate the SIRP on the mobile device 12, which may be transmitted to the management platform 16. The management platform 16 registers the user/speaker, which may include mobile device identification.

In operation, when the user/speaker desires to gain access or verify identity to a control system 14, the user opens one or more software applications associated with the SIS 10 and provides at least one of audio samples, SIVP, and verification codes either via NFC directly or an NFC initiated transmission session using other transmission protocols available on the mobile device, such as Bluetooth, Wi-Fi, or USB. The control system 14 upon receiving the at least one of audio samples, SIVP, and verification codes provides some or all of the information to the management platform 16. The management platform 16 compares the information received from the control system 14 with the information registered with the management platform 16 by the mobile device 12 and provides an access granted response, such as by sending an approved/disapproved authorized/unauthorized, grant/deny message back to the control system 10 based on the comparison. The comparison may also include a comparison of the network time of when the audio samples were taken, the information was received by the control system 14 and the management platform 16 or the entire process may not be initiated until the mobile device 12 is in near field communication, which may be evidenced by a connection between the devices.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware and software, and/or a combination of hardware and software, including firmware, etc. It will also be apparent that systems and/or methods, described herein, may be implemented in different forms of hardware and software, or combinations thereof. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Hardware processor modules may range, for example, from processors, e.g., CPU/GPU/μP, to FPGAs to ASICs, and combinations thereof. Software modules (executed on hardware) may be expressed in a variety of software languages (e.g., computer code), including C, C++, Java, JavaScript, Rust, Go, Scala, Ruby, Visual Basic, FORTRAN, Haskell, Erlang, and/or other object-oriented, procedural, or other programming language and development tools. Computer code may include micro-code or micro-instructions, machine instructions, such as produced by a compiler, code used to produce a web service, and files containing higher-level instructions that are executed by a computer using an interpreter and employ control signals, encrypted code, and compressed code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A speaker verification system comprising:
   at least one processor coupled to a memory to:
      collect at least enrollment audio samples including at least one audio sample sufficient to generate a speaker identification reference pattern;
      collect at least verification audio samples including at least one audio sample sufficient to generate a speaker identification verification pattern;
      generate a speaker identification reference pattern from the enrollment audio samples;
      generate a speaker identification verification pattern from the verification audio samples;
      compare the speaker identification verification pattern with the speaker identification reference pattern; and
      provide a response indicating whether the speaker identification verification pattern and the speaker identification reference pattern were generated based on audio samples from the same person.

2. The system of claim 1, where
   the at least one processor collecting the first and second sets of audio samples is included in a mobile phone.

3. The system of claim 1, where
   the at least one processor comparing the speaker identification verification pattern with the speaker identification reference pattern is part of a management platform remote from the at least one processor collecting the first and second sets of audio samples.

4. The system of claim 3, where
   the at least one processor collecting the first and second sets of audio samples transmits the first and second sets of audio samples to the management platform.

5. The system of claim 3, where
   the at least one processor collecting the first and second sets of audio samples generate speaker identification reference pattern with the speaker identification verification pattern.

6. The system of claim 3, where
   where the management platform provides an access granted response to at least a control system including at least one of the processors.

7. The system of claim 1, where
   the at least one processor includes at least one processor in a mobile device to prompt a user to provide the verification audio samples when in near field communication with at least one processor in a control system.

8. The system of claim 1, where
   the at least one processor generating at least one of the speaker identification verification pattern and the speaker identification reference pattern is included in a mobile device.

9. The system of claim 2, where
   the at least one processor includes at least one processor in a mobile device to transmit at least one of the verification audio samples and speaker identification verification pattern to a control system when in near field communication with the control system.

10. The system of claim 9, where
    the at least one processor includes at least one processor in the control system to transmit at least one of the verification audio samples and speaker identification verification pattern to a management platform to compare to the speaker identification reference pattern; and
    the at least one processor includes at least one processor in the management platform to provide an access granted response to the control system.

11. The system of claim 9, where
    the at least one processor in the mobile device transmits the at least one of the verification audio samples and speaker identification verification pattern to the control system via at least one of NFC, Bluetooth and Wi-Fi.

12. The system of claim 1, where
    the at least one processor that generates at least one of the speaker identification reference pattern and speaker identification verification pattern is in a control system.

13. The system of claim 1, where
    the at least one processor in the control system compares the speaker identification reference pattern and speaker identification verification and provides an access granted response.

14. An audio verification system comprising:
    a mobile device including at least one processor coupled to a memory to: collect at least enrollment audio samples including at least one audio sample sufficient to generate a speaker identification reference pattern, collect at least a verification audio samples including at least one audio sample sufficient to generate a speaker identification verification pattern, generate a speaker identification reference pattern from the enrollment audio samples, generate a speaker identification verification pattern from the verification audio samples, transmit at least one of the verification audio samples and the speaker identification verification pattern;
    a management platform including at least one processor coupled to a memory to: receive the at least one of the verification audio samples and the speaker identification verification pattern, compare the speaker identification verification pattern with the speaker identification reference pattern, and provide an access granted response when the comparison indicates that the speaker identification verification pattern and the speaker identification reference pattern were generated based on audio samples from the same person, and a control system including at least one processor coupled to a memory to: receive the access granted response when the mobile device is in near field communication with the control system.

15. The system of claim 14, where
the management platform receives the at least one of the verification audio samples and the speaker identification verification pattern from the mobile device from the control system when the mobile device is in near field communication with the control system.

16. The system of claim 14, where
the control system receives the access granted response from the management platform.

17. The system of claim 14, where
the at least one processor in the mobile device generates speaker identification reference pattern and the speaker identification verification pattern.

18. A non-transitory computer readable medium storing instructions, the instructions comprising:
one or more instructions which, when executed by one or more processors, cause the one or more processors to:
collect at least enrollment audio samples including at least one audio sample sufficient to generate a speaker identification reference pattern;
collect at least verification audio samples including at least one audio sample sufficient to generate a speaker identification verification pattern;
generate a speaker identification reference pattern from the enrollment audio samples;
generate a speaker identification verification pattern from the verification audio samples;
compare the speaker identification verification pattern with the speaker identification reference pattern; and
provide a response indicating whether the speaker identification verification pattern and the speaker identification reference pattern were generated based on audio samples from the same person.

19. The non-transitory computer readable medium of claim 18, where the one or more instructions are executed in a mobile device.

20. The non-transitory computer readable medium of claim 18, where the one or more instructions, when executed by the one or more processors, further cause the one or more processors to:
transmit an access granted response to at least one processor in a control system, when a mobile device collecting the verification audio samples is in near field communication with the control system.

* * * * *